US006345382B1

(12) United States Patent
Hughes

(10) Patent No.: US 6,345,382 B1
(45) Date of Patent: Feb. 5, 2002

(54) RUN-TIME CUSTOMIZATION IN OBJECT-ORIENTED DESIGN

(75) Inventor: Stephen C. Hughes, Hyde Park, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,786

(22) Filed: Feb. 12, 1998

(51) Int. Cl.[7] ................................................. G06F 9/44
(52) U.S. Cl. ........................ 717/1; 717/2; 717/3; 717/4
(58) Field of Search .................................. 717/1, 2, 3, 4

(56) References Cited

U.S. PATENT DOCUMENTS

| 5,291,585 A | 3/1994 | Sato et al. ................... 395/500 |
| 5,339,430 A | 8/1994 | Lundin et al. ............... 395/700 |
| 5,404,519 A | 4/1995 | Denio ......................... 395/650 |
| 5,410,703 A | 4/1995 | Nilsson et ql. ............. 395/700 |
| 5,504,892 A | 4/1996 | Atsatt et al. ................ 395/600 |
| 5,560,014 A | 9/1996 | Imamura ..................... 395/700 |
| 5,642,511 A | * 6/1997 | Chow et al. ................... 717/1 |
| 5,872,973 A | * 2/1999 | Mitchell et al. ............ 395/685 |

OTHER PUBLICATIONS

Mambo et al., "Proxy signatures for delegating operation", Proceedings of the 3rd ACM conference on Computer and communications security, pp. 48–57, Mar. 1996.*

Aggarwal et al., "On disk caching of Web objects in proxy servers", ACM transaction, Proceedings of the sixth international conference on Information knowledge management, pp. 238–245, Nov. 1997.*

Maltzahn et al., "Performance Issues of Enterprises Level Web Proxies", ACM, pp. 13–23, 1997.*

Lieberherr et al., Int. J. Found. Comput. Sci., Singapore, vol. 5, No. 2, pp. 179–208, (Jun. 1997) (Abstract only).

Stadel, M., Sigplan, Not., vol. 26, No. 1, pp. 99–108 (Jan. 1991) (Abstract only).

* cited by examiner

*Primary Examiner*—Tuan Q. Dam
*Assistant Examiner*—Ted T. Vo
(74) *Attorney, Agent, or Firm*—Floyd A. Gonzalez, Esq.; Lawrence D. Cutter, Esq.; Heslin Rothenberg Farley & Mesiti P.C.

(57) ABSTRACT

A run-time customization capability extends functionality of a software application in a computer system. Through object-oriented design, an instance of a first class is instantiated. The first class (e.g., a derived class) has a same interface as a second class. The first and second classes enable respective first and second functionalities through respective first and second implementations of the same interface. The first implementation is dynamically loaded at run time. The dynamic loading can involve locating the first implementation, such as by using a locator to locate a module comprising the first implementation. A transfer vector usable in accessing the first implementation can be initialized to have an indication of a location of the first implementation. Programming code associated with the same interface can be compiled prior to compilation of programming code associated with the first implementation.

27 Claims, 3 Drawing Sheets

RUN-TIME CUSTOMIZATION IN OBJECT-ORIENTED DESIGN

TECHNICAL FIELD

This invention relates, generally, to object-oriented software design and, more particularly, to user customization of software products in object-oriented design.

BACKGROUND ART

Often, it is desirable to allow the functionality of a complex software system to be extended or customized without providing access to the primary compilation and linkage stream. In particular, it is frequently undesirable or impractical to allow user access to the physical build process.

For example, it may be impractical because development of software might be distributed across multiple environments, such as different organizations or physical locations. In another example, it may be impractical because a software product or application might be intended to be enhanced by a customer, without the customer being given the source code for rebuilding the software product.

Enhancement of software in procedural, non-object oriented implementations typically occurs through dynamic loading of an external, executable object file that implements a customized function. However, in object-oriented implementations, such a solution is unsatisfactory. Namely, the customized function would extend functionality of the application without being associated with any object class. Such a function is termed a global function, and is disfavored in object-oriented design. In particular, a global function is unsatisfactory because it sacrifices important advantages of object-oriented design, since it is not associated with an instance of a class.

In object-oriented design, certain features such as inheritance and polymorphism offer advantages. That is, inheritance capitalizes on code reuse for desirable saving of resources, and polymorphism maximizes overall behavioral consistency. Hence, instances of different classes, that are derived from a common base class, may be managed advantageously similarly.

However, in current implementations of object-oriented code, such as C++, inheritance and polymorphism are available only by compiling and linking a derived class with the definition and implementation of its base class. Unfortunately, this constraint prevents employment of derivation when the ancestral source code is unavailable.

Thus, a need exists for allowing dynamic loading of customized behavior for a derived class, when source code for its base class is unavailable, in object-oriented design implementations.

SUMMARY OF THE INVENTION

Pursuant to the present invention, shortcomings of the existing art are overcome and additional advantages are provided through the provision of a run-time customization capability by which functionality of a software application in a computer system is extended. An instance of a first class is instantiated. The first class has a same interface as a second class. The first and second classes enable respective first and second functionalities through respective first and second implementations of the same interface. The first implementation is dynamically loaded at run time.

In one embodiment, the dynamic loading involves locating the first implementation. Further, a transfer vector usable in accessing the first implementation is initialized. Moreover, the transfer vector is initialized, for instance, to have an indication of a location of the first implementation.

In another embodiment, a locator is used to locate a module comprising the first implementation. Programming code associated with the same interface is compiled prior to compilation of programming code associated with the first implementation.

The same interface and/or the first implementation can include object-oriented design. The same interface can include a declaration of a virtual function which is implemented in the first implementation. The first class can be a derived class.

Thus, the present invention advantageously provides object-oriented dynamic loading of, and access to, customized behavior for a derived class, notwithstanding unavailability of the source code for its base class.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, the functionality of object-oriented software can be extended without providing access to the primary compilation and linkage stream. In particular, a proxy object is provided which is an integral part of a software application allowing customized behavior to be defined at run time by a customized object module.

Figure 1:
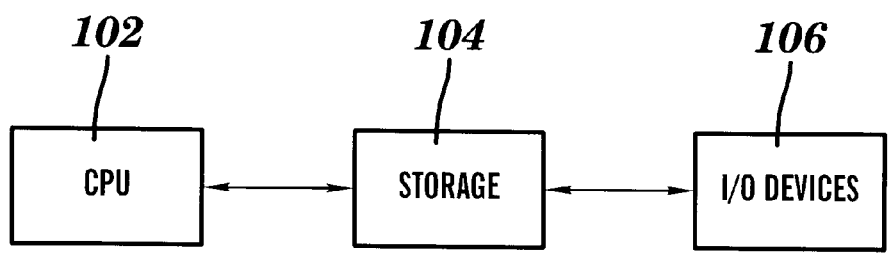
FIG. 1 depicts one example of a computing environment incorporating and using the run-time customization capabilities of the present invention.

An example of a computer system incorporating and using the software extension capabilities of the present invention is depicted in FIG. 1 and described in detail herein.

Referring to FIG. 1, a computing environment 100 includes, for example, at least one central processing unit 102, a main storage 104 and one or more input/output devices 106, each of which is described below.

As is known, central processing unit ("CPU") 102 is the controlling center of computing environment 100 and provides the sequencing and processing facilities for instruction execution, interruption action, timing functions, initial program loading and other machine related functions. The central processing unit executes at least one operating system, which as is known, is used to control operation by controlling the execution of other programs, by controlling communication with peripheral devices, and by controlling use of the computer resources.

Central processing unit 102 is coupled to main storage 104, which is directly accessible and provides for highspeed processing of data by the central processing unit. Main storage 104 may be either physically integrated with the CPU, or constructed in stand-alone units.

Main storage 104 is also coupled to one or more input/output devices 106. These input/output ("I/O") devices include, for example, keyboards, communications controllers, teleprocessing devices, printers, magnetic storage media (e.g., tapes, disks), direct access storage devices, and sensor based equipment. Data is transferred from main storage 104 to input/output devices 106 and from the input/output devices back to the main storage.

In one example, computing environment 100 includes an RS/6000 computer system running an AIX operating system, which are both offered by International Business Machines Corporation. The invention is not limited to such an environment, however. The capabilities of the present invention can be incorporated and used with many types of computer environments and with many types of computer systems or platforms. The above systems are only offered as examples.

Figure 2:
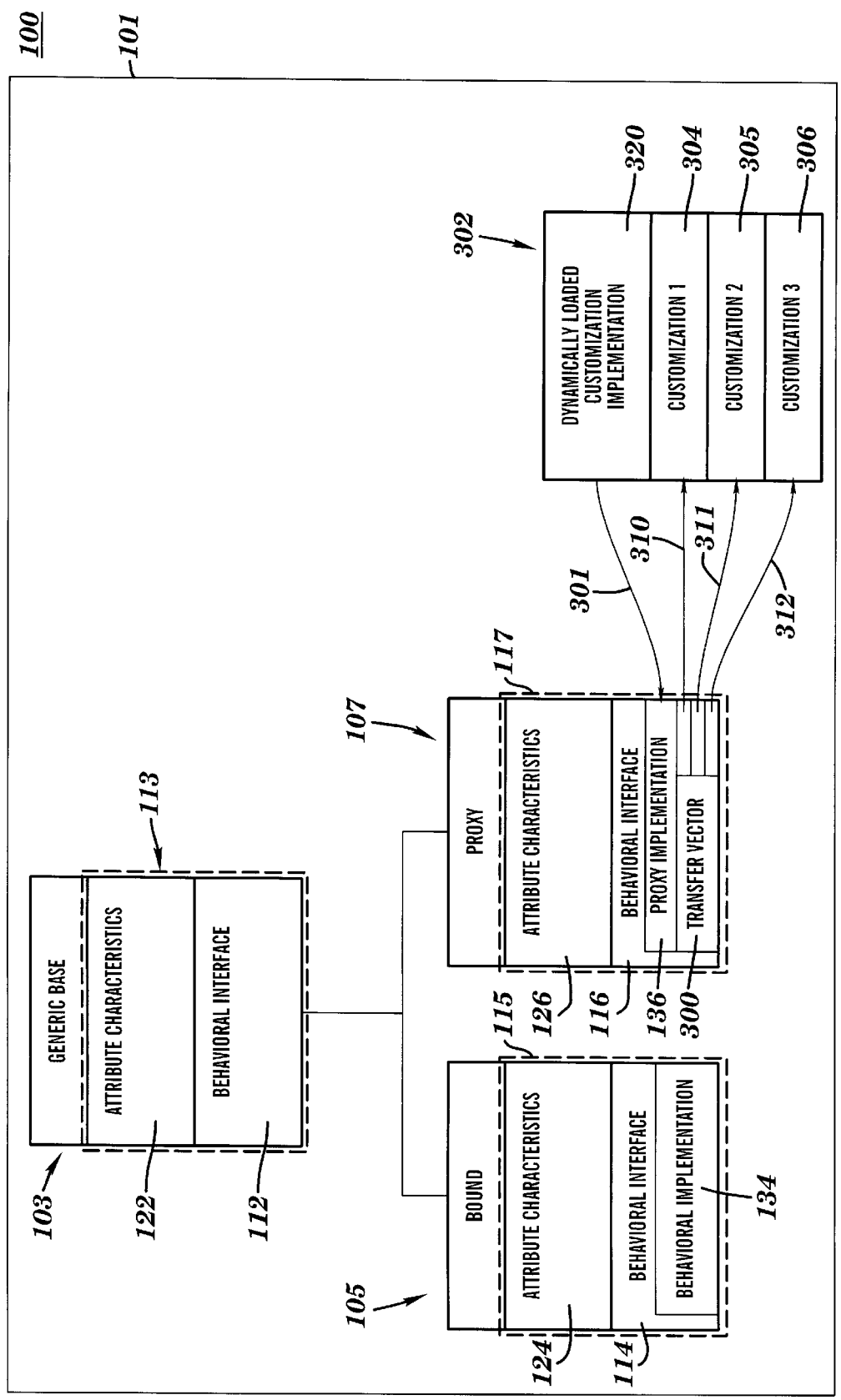
FIG. 2 illustrates a block diagram of one example of a software application of the computing environment of FIG. 1 incorporating and using the run-time customization capabilities of the present invention.

In one embodiment, computing environment 100 includes a software application 101 therein, as shown in FIG. 2. Software application 101 includes a base class 103, GenericBase, with a derived class 105, Bound, and a derived class 107, Proxy. The Bound and the Proxy classes are derived from GenericBase according to object-oriented design technique(s), such as inheritance and polymorphism, as will be understood by those skilled in the art. Thus, the Bound and the Proxy classes, which are different, can be managed advantageously similarly, since they share a common base class 103, for example, GenericBase, in the software system.

Base class 103 provides a basic interface 113 for all of its derived classes, such as Bound 105 and Proxy 107. Generally, the basic interface is located in a header file for GenericBase (e.g., GenericBase.h). This basic interface includes, for example, a behavioral interface 112 and attribute characteristics 122. As will be understood by those skilled in the art, behavioral interface 112 includes declarations of virtual member functions, and attribute characteristics 122 include properties and data.

All classes derived from the same base class share a same interface 113. In Example 1 below, the basic interface includes interface functions "if_1(), if_2(), and if_3()." A given base class 103 may fully implement a non-virtual function that is inherited by all of the classes derived from that base class. For convenience, implementation of such a non-virtual function may optionally appear in ancestral interface 112. Furthermore, the base class can, through its interface, dictate that each derived class 105, 107 may, through regular virtual functions, or must, through pure virtual functions, individually implement a certain function. Thus, Bound class 105 has behavioral interface 114 (e.g., in Bound.h), and Proxy class 107 has behavioral interface 116 (e.g., in Proxy.h), where behavioral interfaces 114 and 116 conform or correspond to their ancestral behavioral interface 112.

Generally, behavioral interfaces 112, 114, and 116 include declarations of member functions or methods. Usually, these declarations appear in "header" or ".h" files. Optionally, GenericBase 103 may be an abstract class, of which no instances are created.

In its header file, Bound 105 includes an interface file 115 having member function declarations 114 as well as attribute characteristics 124. The implementations of the member functions of the Bound class appear in behavioral implementation 134, as will be understood by those skilled in the art. Generally, the implementations of the member functions for the Bound class are located in an implementation file (e.g., Bound.cc or Bound.c) therefor.

Proxy class 107 includes a header file which includes an interface file 117 having behavioral interface 116 and attribute characteristics 126. The implementations of the member functions of the Proxy class are accessible through Proxy implementation 136, as described herein. Furthermore, the Proxy implementation is located in an implementation file for Proxy (e.g., Proxy.cc or Proxy.c), as will be understood by those skilled in the art. Advantageously, the implementations of the member functions of the Proxy class can be customized, as illustrated in Examples 1–4 below. With respect to the code presented in the Examples, "user" is referenced; however, the code may be customized by, or for, someone other than the user (e.g., a customer or customizer).

A user receives primarily, or only, executable object code from the manufacturer. Namely, the user receives little, or no, source code of basic interface 113. That is, most or all of the source code is written by the manufacturer or supplier, and is partly or completely inaccessible to the user.

As will be appreciated by those skilled in the art, the object code may include main.o, GenericBase.o, Bound.o, and Proxy.o. Further, the object code may have been previously translated using source code such as main.cc, GenericBase.h, GenericBase.cc, Bound.h, Bound.cc, Proxy.h, and Proxy.cc, along with any desired and/or appropriate libraries. This source code may be completely denied to the user.

Thereafter, the user writes the user's own source file(s) or customization module(s) 302 (FIG. 2), and translate these into the user's own object file(s). The user can link the user's own object file(s) and any desired and/or appropriate libraries in order to effect compilation of an executable file. In accordance with the present invention, this executable file advantageously includes class instances whose instantiation code framework has been coded by the manufacturer, yet whose implementation is customized by the user through the user's own object file(s) 302. Desirably, this user customization 302 is dynamically loaded at run time or execution time of software system 101, as described herein.

For explanatory purposes, Examples 1–4 present pseudo code based on C++, an exemplary high-level language suited for object orientation. As will be understood by those skilled in the art, comments placed in the Examples serve to explain the code. Also, reference numerals parenthetically inserted into the comments for the code serve to further explain the FIG. 2 depiction of operation of computing environment 100.

Certain code in the Examples, for purposes of illustration, contains syntax specific to an exemplary operating system offered by International Business Machines Corporation under the trade designation IBM AIX 4.1. Nevertheless, the corresponding concepts can be applied to any operating system which supports object-oriented programming and dynamic loading, where identical and/or different syntax and/or nomenclature may be employed.

One example of how an object-oriented design provides user customization of object code supplied by a manufacturer is described with reference to FIG. 3.

The manufacturer writes the source code for the interface of the Proxy class, STEP 200. This interface contains the declarations of functions, data types, and constants for the Proxy class. One example of pseudo code for the interface is shown below in Example 1.

In particular, Example 1 illustrates pseudo code for interface file 117 of Proxy class 107, which is derived from GenericBase base class 103. This interface file may be a header file such as Proxy.h. A parameter, "name," within the Examples serves as a locator for loading the customization implementation, and creating a transfer vector from the member functions of the Proxy class to the loaded implementation, as detailed in the Examples.

EXAMPLE 1

INTERFACE (117) OF PROXY CLASS (107)

```
class Proxy:public GenericBase {
private:
   typedef int (*(member_function))(void*data);
// typedef for a customization routine.
   typedef int (*init_xferv_t)(member_function*);
// typedef for access, in the implementation (136) of
// the constructor, to the main entry (320, FIG. 2) of
// the customization routine. The implementation of the
// constructor is shown in Example 2 below. Also, the
// customization routine is illustrated in Example 4,
// below.
   transfer_vector_custom[3];
// Transfer vector (300, FIG. 2) is, for example, an
// array used to access member function customizations
// (304–306, FIG. 2). The elements of the "_custom[]"
// array are set in the user's initialization code,
// which is called from the implementation (136) of the
// constructor. "₁₃ custom[]" is selected to have three
// entries. So, three functions can be customized.
public:
   Proxy(char*name);
// Constructor: "name" is a pointer to the customized
// object module (302) which will be dynamically loaded.
// In other words, "name" is the name of the object
// module (302) which contains the user's customization
// code. That is, "name" is a parameter passed to the
// constructor (136) of the Proxy object (107), and is
// used to locate the module (302) to be dynamically
// loaded.
   virtual int if_1(void*data);
// Interface function with one parameter: "data" is a
// pointer to some input.
   virtual float if_2(void);
// Interface function with no parameters.
   virtual struct mystruct if_3(int, void*data);
// Interface function with two parameters and a complex
// return type.
   ~Proxy(void) {;}
// An exemplary destructor is provided. However, this
// destructor requires no function, so the default
// destructor generated by the compiler would suffice.
};
```

Figure 3:
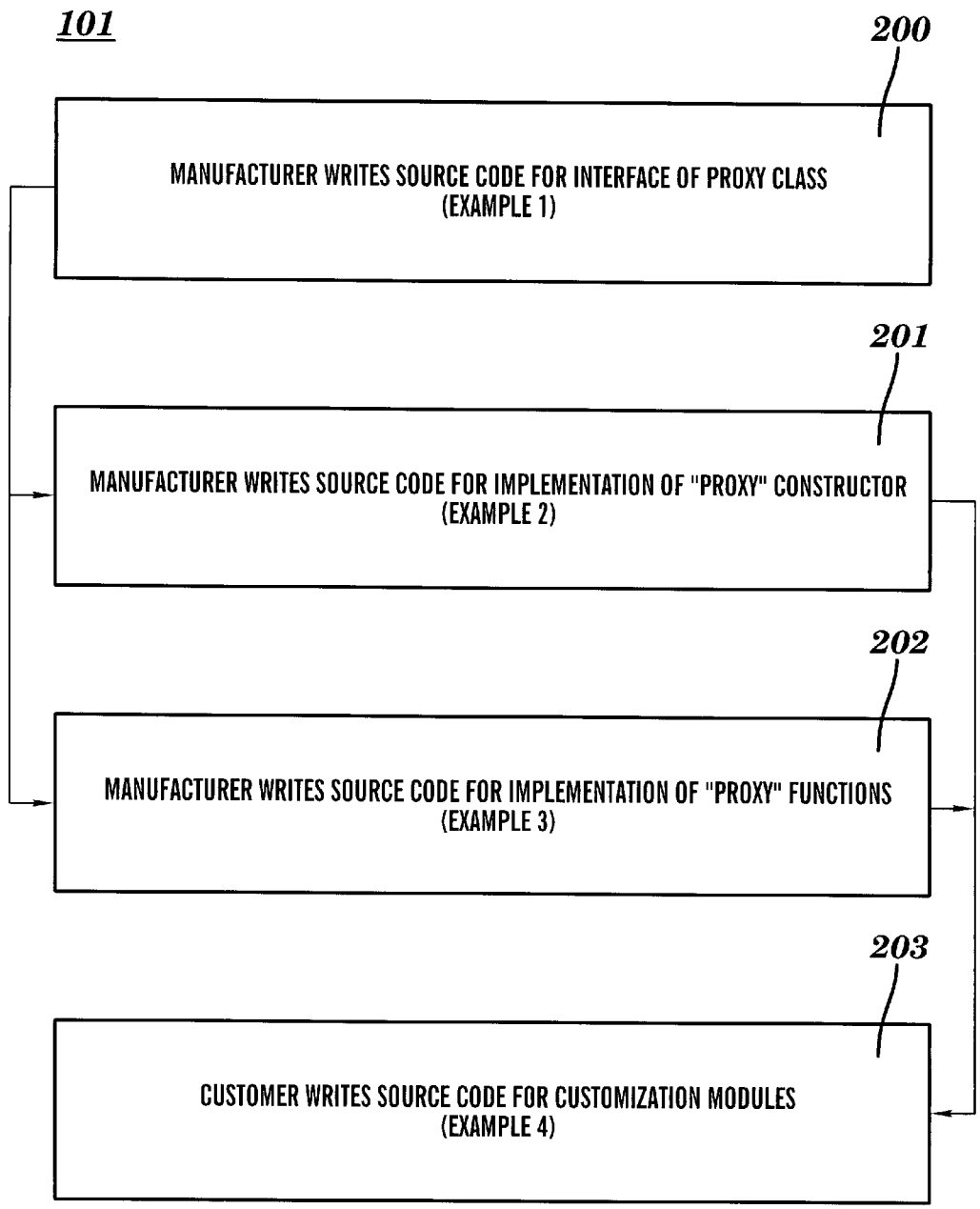
FIG. 3 represents one embodiment of an organizational diagram of the software application of FIG. 2, in accordance with the principles of the present invention.

In addition to the above, the manufacturer writes the source code for the implementation of the Proxy constructor, STEP 201 (FIG. 3). The Proxy constructor is a function that initializes new instances of the Proxy class. One example of pseudo code for the Proxy constructor is depicted below in Example 2.

Namely, Example 2 illustrates pseudo code for the implementation of the constructor for Proxy class 107. This implementation may appear in an implementation file 136 such as Proxy.cc. The Proxy implementation file contains function definitions for each function declared in the Proxy header file. In accordance with the principles of the present invention, instantiation of an instance of the Proxy class 107 invokes the constructor, which dynamically and at run time of software application 101 incorporates in the instance the customized behavior specified in customization module 302.

EXAMPLE 2

IMPLEMENTATION OF "PROXY" CONSTRUCTOR

```
Proxy::Proxy(char*name)
{
// Constructor: "name" is a pointer to the name of the
// customized object module (302), which will be
// dynamically loaded.
   init_xferv_t initxferv;
// Use of typedef "init_xferv_t" from interface file
// (117) of the Proxy class. "initXferv" is the
// initialization transfer vector (300, FIG. 2).
   initXferv =(init_xferv_t)
      load(name,1, "/usr/local/dynload");
// Load the customization module (302). The
// customization module (302) contains the code which is
// dynamically loaded. Namely, the customization module
// includes an initialization function and one or more
// customized member functions (304–306). The actual
// structure of the customization module is specifically
// tailored to the operating system on which it is
// implemented. The address of the initialization
// function is returned as a result of loading the
// customization module, at run time of software
// application 101 (ARROW 301, FIG. 2). "init_xferv_t"
// casts the type of the function pointer returned by
// the load operation (ARROW 301). The casting is to a
// pointer which points to the initialization function.
// "load() " is syntax for a function that is specific to
// IBM AIX 4.1. In particular, "load()" dynamically
// loads an executable. The syntax for the load
// operation on AIX is: "load(char*file_path, int
// flags, char*lib_path)," where "file_path" is the
// "name" of the file to be loaded, "flags" is an
// integer value which indicates how unresolved symbols
// are to be handled, and "lib_path" is the directory in
// which the file to be loaded can be found. For this
// embodiment, the directory has been selected to be
// "/usr/local/dynload."
   (*initXferv)(_custom);
// Initialize the elements of transfer vector (300)
// "_custom[]" to point to the customized implementation
// routines (304–306) which are contained in the
// customization module (302).
}
```

Moreover, the manufacturer writes the source code for the implementation of the Proxy functions, STEP 202. The Proxy functions are methods that are members of the Proxy class. One example of pseudo code for the implementation of the Proxy member functions is illustrated below in Example 3. That is, Example 3 represents pseudo code for the implementation of the member functions for Proxy class 107. This implementation would preferably be located in the implementation file 136 (FIG. 2), which has been described above.

By detailing an implementation of the member function "if_3()," Example 3 demonstrates how any customizable member function of the Proxy class may be implemented. Also, at a time when a Proxy member function is called, the corresponding instance of the Proxy class has already been loaded with the user's customization module 302. That is, the Proxy object has already been customized when a call is made to a member function.

EXAMPLE 3

IMPLEMENTATION OF "PROXY" FUNCTION

```
int Proxy::if_1(void*data)
    {typedef int (*(if_1_t))(void*);
    int rc;
    assert(_custom[0]!=NULL);
    rc=(*((if_1_t)_custom[0]))(data);
// Invoke member function through transfer vector (300;
// ARROW 310, FIG. 2; 304)
    return rc;
    }
float Proxy::if_2(void)
    typedef int (*(if_2_t))(void);
    float rc;
    assert(_custom[1]!=NULL);
    rc=(*((if_2_t)_custom[1]))();
// Invoke member function through transfer vector (300;
// ARROW 311, FIG. 2; 305)
    return rc;
}
{struct myStruct Proxy::if_3(int i, void*data)
// The defined interface (116) for "if_3()" is to accept
// two parameters (an integer and a void pointer), and
// to return a structure of type "myStruct." The actual
// type of the object pointed to by the void pointer
// is agreed on by both the call to the function and the
// implementation of the function. The parameter "i"
// in the call to "if_3()" is data processed by the call
// to the member function (136), as described herein.
    typedef int (*(if_3_t))(struct myStruct*int, void *);
// The elements of the transfer vector (300) "_custom"
// have a generic function call interface, and is cast
// to the specific interface (of "customization3," in
// Example 4 below) to pass the proper parameters.
    struct mystruct rc;
    assert(_custom[2]!=NULL);
// "assert" transfer vector (300) has been initialized
// properly.
    (*((if_3_t) _custom[2]))(&rc, i, data);
    return rc;
// In order to preserve the return type of "int" in
// calling the customization routine (306), the address
// of the parameter "i" (that holds the return value
// which this member function is required to return) is
// passed to the customization function (306). The
// customization function (306) uses this address to
// actually set "rc" in this routine, and the value of
// "rc" is returned to the caller of this function.
// (ARROW 312, FIG. 2)
}
```

Furthermore, the customer writes the source code for customization modules, STEP 203. One example of pseudo code for a customization module is shown below in Example 4.

In particular, Example 4 illustrates source code for the customization routines 304–306 written by the user of software system 101 that employs an instance of the customizable Proxy class 107. The user preferably provides one module 302 for each class 107 he or she customizes. The object module 302 for each customization would reside in a specific directory defined by computing environment 100. In this embodiment, that directory is "/usr/local/dynload," as shown above in Example 1. The locator (i.e., "name") of the object module 302 is obtained from the user and passed to the Proxy constructor 136, as detailed above in Examples 1–2. That is, the user dynamically specifies at run time of software application 101 the customization 302 of an instance of the Proxy class 107.

The executable version of the Example 4 source code, as obtained through compilation thereof, would reside in a location specified by a convention of a computing environment 100 which uses Proxy object 107. Preferably, the source code of Example 4 is translated into user object file(s) and linked to create an executable file that can dynamically customize the Proxy object of the Manufacturer's system.

EXAMPLE 4

"PROXY" CUSTOMIZATION CONDUIT (302)

```
int customization1(void*);
int customization2(void);
int customization3(struct myStruct*, int, void*);
// Declaration of custom member functions (304–306).
// The argument types of "customization1, customization2
// and customization3" conform to those of interface
// functions "if_1(), if_2(), and if_3()," respectively,
// as declared in the interface file (117) of the Proxy
// class (107).
int customizationInit(void**data)
// Main entry point (320) for customization module
// (302).
{
    data[0]=customization1;
    data[1]=customization2;
    data[2]=customization3;
// The address of this function is returned as a
// "result" (below) of dynamically loading this module
// (302; ARROW 301). This function is passed the
// address of the transfer vector (300) contained in the
// instance of the Proxy object (107) that is loading
// this module (302), through the "_custom" parameter in
// the statement "(*initXferv)(_custom);" of the Proxy
// constructor (136). This routine (320) fills in the
// transfer vector (300) with the addresses of the
// customization routines (304–306) for the member
// functions (136). The statements are ordered
// according to a predefined convention.
    return 3;
// Checking mechanism: "return" the number of
// customization routines (304–306) for validation of
}// conformity to the customization interface (116).
// Implementation of custom member functions (304–306).
int customizationl(void*data)
{
    int result;
// Cast "data" to the type it is known to be and
// perform some operations which set "result."
    return result;
}
int customization2(void)
{
    int result;
// Perform some operations which set "result."
    return result;
}
```

```
int customization3(struct mystruct*rc, int i, void* data)
{
  struct myStruct return_value;
// Cast "data" to the type it is known to be and
// perform some operations which set "return_value."
  *rc=return_value;
  return 0;
// Optionally, "return" value may be used for
// "metadata" (e.g., success/failure status).
}
```

So, dynamic loading of customization module 302 is accomplished using a locator (i.e., "name") to locate the customization module. Further, in locating the customization module during the dynamic loading, transfer vector 300 is initialized for accessing member function customizations 304–306. Thus, Proxy implementation 136 is advantageously customized by user code compiled after compilation of behavioral interface 116, in accordance with the principles of the present invention.

Software application 101 may include any language(s) suited for object orientation (e.g., C++ and/or "JAVA"). Furthermore, computing environment 100 may use any machine language(s), assembly language(s), and/or high-level language(s). As will be understood by those skilled in the art, the described header (e.g., ".h") file(s) and implementation (e.g., ".c" or ".cc") file(s) are exemplary. Such file(s) may include any type(s) of code. Moreover, any computing environment 100 and/or any software application 101 may include any number of these file(s), and/or other unit(s). In addition, computing environment 100 may include any number of software application(s) 101. Also, GenericBase 103 may occupy any appropriate position in a hierarchy of software application 101. These concepts will be appreciated by those skilled in the art.

Numerous alternative embodiments of the present invention exist. A base class 103 can have derived therefrom any number of classes such as Bound 105 and/or Proxy 107. Further, behavioral interfaces 112, 114, and 116 can be designed with any number and/or type(s) of member function(s) and/or attribute(s).

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of extending functionality of an application, said method comprising:
   instantiating an instance of a class, said class having an interface declaring a first function and a second function, wherein an implementation of the first function is defined with the class and included within the interface; and
   dynamically loading at run-time an implementation for the second function, wherein the dynamically loading comprises:
      locating said implementation for the second function, wherein said locating comprises initializing a transfer vector usable in accessing said implementation for the second function, wherein said initializing comprises indicating in said transfer vector an indication of a location of said implementation for the second function; and
      incorporating the implementation for the second function into the interface of the instantiated instance of the class to extend functionality of the instantiated instance of the class, wherein an implementation for the first function is not dynamically loaded at run-time.

2. The method of claim 1, wherein said locating comprises using a locator to locate a module comprising said implementation for the second function.

3. The method of claim 1, wherein programming code associated with said interface is compiled prior to compilation of programming code associated with said implementation for the second function.

4. The method of claim 1, wherein at least one of said interface and said implementation for the second function includes object-oriented design.

5. The method of claim 1, wherein said interface includes a declaration of a virtual function.

6. The method of claim 5, wherein said implementation for the second function includes an implementation of said virtual function.

7. The method of claim 1, wherein said class is a derived class.

8. The method of claim 1, wherein functionality of said instantiated instance of the class is customized by a user of the application.

9. The method of claim 1, further comprising identifying, by a user, said implementation for the second function at run-time.

10. The method of claim 1, wherein said interface of said instantiated instance of the class is compiled before run-time.

11. The method of claim 1, further comprising compiling said interface of said instantiated instance of the class, and compiling said implementation for the second function separately from said compilation of said interface.

12. The method of claim 1, wherein said dynamically loading comprises selecting said implementation for the second function from one or more implementations based upon data being processed by said application.

13. The method of claim 1, further comprising instantiating another instance of the class, and dynamically loading at run-time another implementation for the second function.

14. At least one program storage device readable by a machine, tangibly embodying at least one program of instructions executable by the machine to perform a method of extending functionality of an application, said method comprising:
   instantiating an instance of a class, said class having an interface declaring a first function and a second function, wherein an implementation of the first function is defined with the class and included within the interface; and dynamically loading at run-time an implementation for the second function, wherein the dynamically loading comprises:

locating said implementation for the second function, wherein said locating comprises initializing a transfer vector usable in accessing said implementation for the second function, wherein said initializing comprises indicating in said transfer vector an indication of a location of said implementation for the second function; and incorporating the implementation for the second function into the interface of the instantiated instance of the class to extend functionality of the instantiated instance of the class, wherein an implementation for the first function is not dynamically loaded at run-time.

15. The at least one program storage device of claim 11, wherein said locating comprises using a locator to locate a module comprising said.

16. The at least one program storage device of claim 14, wherein programming code associated with said interface is compiled prior to compilation of programming code associated with said implementation for the second function.

17. The at least one program storage device of claim 14, wherein at least one of said interface and said implementation for the second function includes object-oriented design.

18. The at least one program storage device of claim 14, wherein said interface includes a declaration of a virtual function.

19. The at least one program storage device of claim 18, wherein said implementation for the second function includes an implementation of said virtual function.

20. The at least one program storage device of claim 14, wherein said class is a derived class.

21. The at least one program storage device of claim 14, wherein said dynamically loading comprises selecting said implementation for the second function from one or more implementations based upon data being processed by said application.

22. The at least one program storage device of claim 14, wherein said method further comprises instantiating another instance of the class, and dynamically loading at run-time another implementation for the second function.

23. A system of extending functionality of an application, said system comprising:

means for instantiating an instance of a class, said class having an interface declaring a first function and a second function, wherein an implementation of the first function is defined with the class and included within the interface; and means for dynamically loading at run-time an implementation for the second function, wherein the dynamically loading comprises:

means for locating said implementation for the second function, wherein said means for locating comprises means for initializing a transfer vector usable in accessing said implementation for the second function, wherein said means for initializing comprises means for indicating in said transfer vector an indication of a location of said implementation for the second function; and means for incorporating the implementation for the second function into the interface of the instantiated instance of the class to extend functionality of the instantiated instance of the class, wherein an implementation for the first function is not dynamically loaded at run-time.

24. The system of claim 23, wherein said means for dynamically loading further comprises means for selecting said implementation for the second function from one or more implementations based upon data being processed by said application.

25. The system of claim 23, further comprising means for instantiating another instance of the class, and means for dynamically loading at run-time another implementation for the second function.

26. An article of manufacture, comprising:

at least one computer usable medium having computer readable program code means embodied therein for causing an extension of functionality of an application, the computer readable program code means in said article of manufacture comprising:

computer readable program code means for causing a computer to instantiate an instance of a class, said class having an interface declaring a first function and a second function, wherein an implementation of the first function is defined with the class and included within the interface; and computer readable program code means for causing a computer to dynamically load at run-time an implementation for the second function, wherein the computer readable program code means for causing a computer to dynamically load comprises:

computer readable program code means for locating said implementation for the second function, wherein said computer readable program code means for locating comprises computer readable program code means for initializing a transfer vector usable in accessing said implementation for the second function, wherein said computer readable program code means for initializing comprises computer readable program code means for indicating in said transfer vector an indication of a location of said implementation for the second function; and computer readable program code means for causing a computer to incorporate the implementation for the second function into the interface of the instantiated instance of the class to extend functionality of the instantiated instance of the class, wherein an implementation for the first function is not dynamically loaded at run-time.

27. A method of extending functionality of an application, said method comprising:

instantiating an instance of a first class, said first class having a same interface as a second class, said first and second classes enabling respective first and second functionalities through respective first and second implementations of said same interface; and dynamically loading at run-time said first implementation, said dynamically loading comprising: locating said first implementation, wherein said locating comprises initialize a transfer vector usable in accessing said first implementation, wherein said initializing comprises indicating in said transfer vector an indication of a location of said first implementation; and incorporating said first implementation into said interface of said first class, wherein functionality of said first class is extended.

* * * * *

UNITED STATES PATENT AND TRADEMARK OFFICE
CERTIFICATE OF CORRECTION

PATENT NO.    : 6,345,382 B1
DATED         : February 5, 2002
INVENTOR(S)   : Hughes It is certified that error appears in the above-identified patent and that said Letters Patent is hereby corrected as shown below:

<u>Column 6,</u>
Line 15, delete "init xferv t initxferv;" and insert -- init_xferv_t initXferv; --.

<u>Column 7,</u>
Line 36, delete "(struct myStruct*int, void *);" and insert -- (struct myStruct *, int, void *); --.

<u>Column 8,</u>
Line 52, delete "}" at the beginning of the sentence and insert -- } -- alone on a new line subsequent to line 52.

<u>Column 9,</u>
Line 1, delete "(struct mystruct*rc, int i, void* data)" and insert -- (struct myStruct * rc, int i, void * data) --.

<u>Column 11,</u>
Line 22, after the word "said" insert -- implementation for the second function. --

Signed and Sealed this

Thirteenth Day of August, 2002

*Attest:*

*Attesting Officer*

JAMES E. ROGAN
*Director of the United States Patent and Trademark Office*